H. V. SNELL & J. CALLAN.
WHEEL.
APPLICATION FILED JULY 15, 1911.

1,031,822. Patented July 9, 1912.

Inventors:
Henry V. Snell
John Callan

UNITED STATES PATENT OFFICE.

HENRY V. SNELL AND JOHN CALLAN, OF GLOBE, ARIZONA.

WHEEL.

1,031,822.   Specification of Letters Patent.   Patented July 9, 1912.

Application filed July 15, 1911. Serial No. 638,685.

*To all whom it may concern:*

Be it known that we, HENRY V. SNELL and JOHN CALLAN, citizens of the United States, residing at Globe, in the county of Gila and State of Arizona, have invented certain new and useful Improvements in Wheels, of which the following is a specification.

This invention relates to that class of vehicle wheels which are provided with a cushion tire, the cushioning element being metallic springs which are interposed between inner and outer rims, the spokes of the wheel being connected to the inner rim.

It is the object of the present invention to provide a novel arrangement of springs whereby a maximum resiliency is obtained, and also to provide a structure whereby the various movements of the spokes incident to the travel of the wheel are rendered smooth and easy.

The invention also has for its object to provide a novel construction and arrangement of parts to be hereinafter described and claimed, and in order that the invention may be better understood, reference is had to the accompanying drawing forming a part of this specification, in which drawing—

Figure 1:
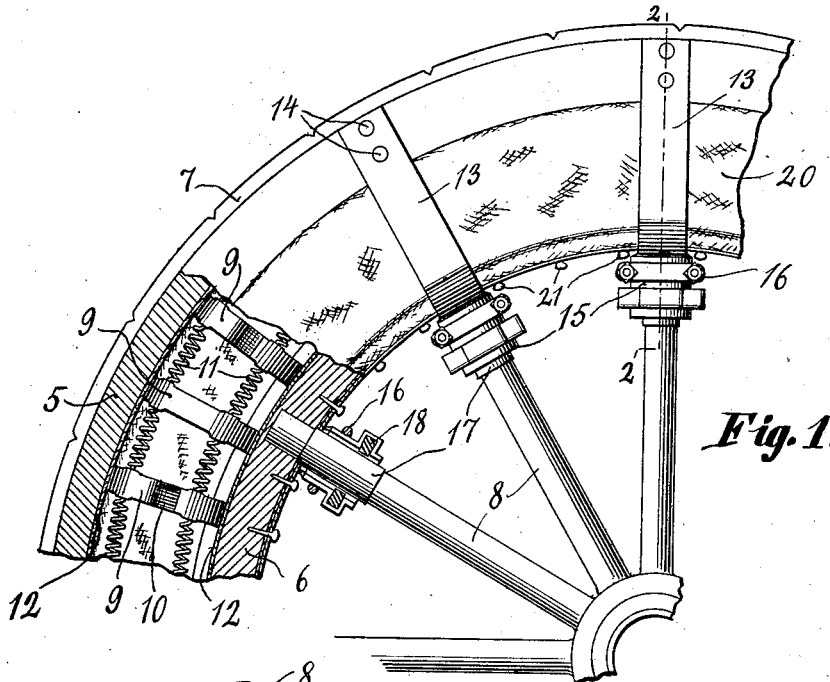
Figures 2, 3:
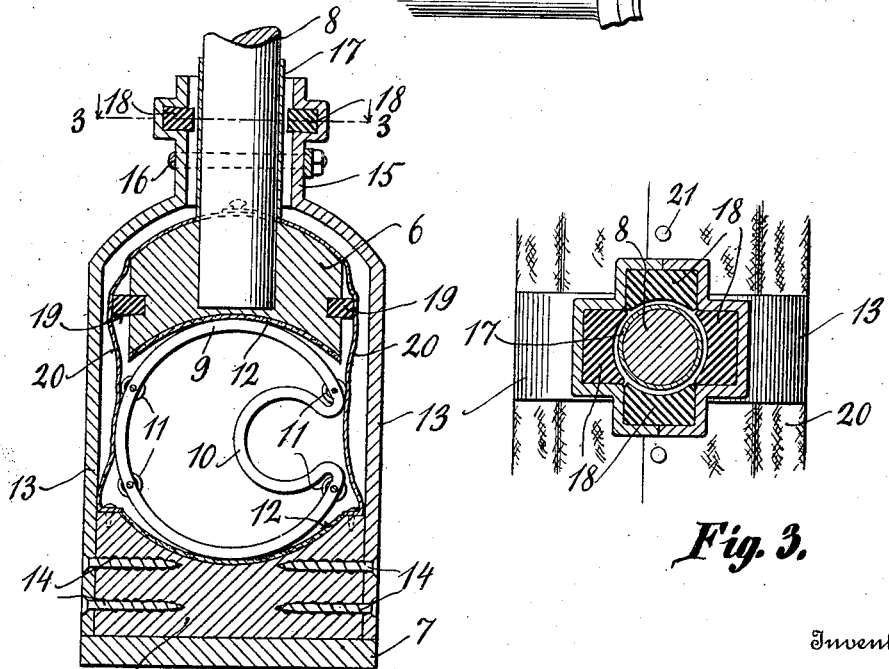

Figure 1 is an elevation, partly in section, of a fragment of the wheel. Fig. 2 is a transverse section on the line 2—2 of Fig. 1. Fig. 3 is a section on the line 3—3 of Fig. 2.

The rim of the wheel is in two sections, 5 and 6, respectively, which are spaced apart and normally concentric. The outer section 5 is fitted with a steel or other tire 7, and to the inner section 6 are fastened the spokes 8 of the wheel.

Between the rim sections 5 and 6 is interposed a series of springs 9, each of which springs is a flat strip which is bowed transversely of the rim so that it is crescent-shaped in cross section, the ends of the strip being connected by an inwardly extending crescentic portion 10. The strips are spaced apart endwise and are connected by coiled springs 11 to form a continuous spring. The springs 9 seat in channels made in the inner periphery of the outer rim section, and in the outer periphery of the inner rim section, and the portion 10 is located between said rim sections. If necessary, a cushion 12 of felt or other suitable material may be interposed between the springs and the contiguous portions of the rim sections.

The rim sections 5 and 6 are held in assembled position by braces 13 which are secured to the section 5 on both sides thereof by screws or other suitable fastening means 14. These braces extend inwardly and radially, and straddle the rim section 6, and they terminate at their inner ends in sockets 15 through which the spokes 8 loosely pass to the rim section 6. The inner ends of the braces are encircled by a U-bolt 16. That portion of the spoke which passes through the socket is fitted with a metal wear sleeve 17, and the socket has dovetailed pockets in which seat rubber buffer blocks 18. Four of these blocks are provided for each spoke, they being arranged so as to completely encircle the spoke, but spaced therefrom to allow the spoke to work freely. That portion of the rim section 6 which is straddled by the braces 13 carries rubber buffer blocks 19, one on each side of said rim section.

The springs 9 are provided with a cover 20 of canvas or other suitable material, which cover is fastened to the inner edge of the rim section 5, and extends across the space between said rim section and the rim section 6, to which latter it is made fast by hooks 21. The purpose of this cover is to exclude mud, dust, etc., from the springs.

In operation, the weight of the vehicle and the load is transmitted through the spokes 8 and the rim section 6, and as the wheel rotates, said rim section yields outwardly, the thrust being taken up by the springs 9. The spokes are free to move radially through the sockets 15. In the jars or shocks occasioned by the wheels passing over rough surfaces, the rim 5 tends to yield inwardly, thus pressing against the springs 9, so that the latter will absorb all shocks. The vehicle therefore travels smoothly, and it is possible to dispense with a pneumatic tire, all the advantages of the same being obtained by the herein-described structure. The strength and the number of the springs may be varied according to the weight and character of the vehicle. The outer rim always retains its circular shape, so that less power is required to drive the vehicle. This is a distinct advantage over pneumatic tires which latter flatten to a more or less extent where they are in contact with the ground, which has the same effect as traveling up hill at all times. The blocks 18 on the sides of the spokes serve to take up the impact or jar occasioned by the wheels passing over rough surfaces, and the other blocks serve to take up lost motion and to accommodate the spokes to the various movements incident to the travel of the wheel when the latter is in motion.

The construction is cheap and strong, and the expense of repairs and renewal is reduced to a minimum. Old wheels can be used by simply sawing off the spokes at the proper length and supplying the rim sections and springs.

We claim:

1. A wheel having spaced inner and outer rim sections, and cushioning means interposed between said rim sections, said cushioning means comprising separated and independent strips which are bowed transversely of the rim, and connected at their ends by an inwardly curved portion, said curved portion being at one side of the rim and a resilient connection between the strips.

2. A wheel having spaced inner and outer rim sections, springs interposed between said rim sections, said springs comprising separated and independent flat strips which are bowed transversely of the rim into the shape of a crescent, and the ends of the strips being located at one side of the rim and connected by an inwardly extending crescentic portion, and a resilient connection between the strips.

3. A wheel having inner and outer rim sections, cushioning elements interposed between said rim sections, braces secured to the sides of the outer rim section and straddling the inner rim section, the inner ends of said braces being shaped to form sockets having diametrically opposite pockets, spokes passing loosely through the sockets and secured to the inner rim section, and buffer blocks located in the pockets and surrounding that portion of the spokes passing through the sockets.

In testimony whereof we affix our signatures in presence of witnesses.

HENRY V. SNELL.
JOHN CALLAN.

Witnesses as to Henry V. Snell:
WALTER G. SCOTT,
JOHN D. WINK, Jr.,
G. O. NOLAN,
GRAYEE MOORMAN.

Witnesses as to John Callan:
G. O. NOLAN,
GRAYEE MOORMAN.

---

Copies of this patent may be obtained for five cents each, by addressing the "Commissioner of Patents, Washington, D. C."